(12) United States Patent
Landphair et al.

(10) Patent No.: US 8,365,679 B2
(45) Date of Patent: Feb. 5, 2013

(54) SEED SPACING MONITORING SYSTEM FOR USE IN AN AGRICULTURAL SEEDER

(75) Inventors: Donald K. Landphair, Bettendorf, IA (US); James Z. Liu, Belvidere, IL (US)

(73) Assignee: Deere & Company, Moline, IL (US)

( * ) Notice: Subject to any disclaimer, the term of this patent is extended or adjusted under 35 U.S.C. 154(b) by 162 days.

(21) Appl. No.: 12/860,290

(22) Filed: Aug. 20, 2010

(65) Prior Publication Data
US 2012/0046838 A1    Feb. 23, 2012

(51) Int. Cl.
| | |
|---|---|
| A01C 15/00 | (2006.01) |
| A01C 7/18 | (2006.01) |
| A01B 69/00 | (2006.01) |
| A01B 79/00 | (2006.01) |
| A01D 34/00 | (2006.01) |
| G06F 7/70 | (2006.01) |
| G06F 19/00 | (2011.01) |
| G06G 7/00 | (2006.01) |
| G06G 7/76 | (2006.01) |

(52) U.S. Cl. ........... 111/200; 111/69; 56/10.2 A; 701/50
(58) Field of Classification Search ........................ None
See application file for complete search history.

(56) References Cited

U.S. PATENT DOCUMENTS
| | | | |
|---|---|---|---|
| 6,081,224 A | 6/2000 | Rosenbrock | |
| 6,386,128 B1 | 5/2002 | Svoboda et al. | |
| 7,726,251 B1 | 6/2010 | Peterson et al. | |
| 2009/0090284 A1* | 4/2009 | Peterson et al. | ............... 111/185 |
| 2011/0046776 A1 | 2/2011 | Goldman et al. | |

FOREIGN PATENT DOCUMENTS
| | | |
|---|---|---|
| FR | 2366783 | 5/1978 |
| WO | 2008155235 | 12/2008 |

OTHER PUBLICATIONS

European Search Report, received Jan. 6, 2012 (5 pages).

* cited by examiner

*Primary Examiner* — Ryan Zeender
*Assistant Examiner* — H Rojas
(74) *Attorney, Agent, or Firm* — Taylor IP, P.C.

(57) ABSTRACT

A seed spacing monitoring system is used In an agricultural seeder for planting seeds. The agricultural seeder has a furrow opener, a seed meter for metering seed to be dispensed in the furrow, and a furrow closer to cover the seed in the furrow. The seed spacing monitoring system includes a detector supported to detect seeds in the furrow prior to the seeds being covered. The detector provides a plurality of seed presence signals, with each seed presence signal being indicative of a respective seed present in the furrow. A speed sensor is associated with the seeder and provides a speed signal indicating a ground speed of the seeder. An electrical processor receives the plurality of seed presence signals and the speed signal. The electrical processor determines a seed spacing, dependent upon the seed presence signals and the speed signal.

10 Claims, 5 Drawing Sheets

SEED SPACING MONITORING SYSTEM FOR USE IN AN AGRICULTURAL SEEDER

FIELD OF THE INVENTION

The present invention relates to agricultural seeders, and, more particularly, to seed spacing monitoring systems for use in such seeders.

BACKGROUND OF THE INVENTION

An agricultural seeder, such as a row crop planter or grain drill, places the seed at a desired depth within a plurality of parallel seed trenches (or furrows) formed in soil. In the case of a row crop planter, a plurality of row crop units are typically ground driven using wheels, shafts, sprockets, transfer cases, chains and the like. Each row crop unit has a frame, which is movably coupled with a tool bar. The frame may carry a main seed hopper, herbicide hopper and insecticide hopper. If the granular herbicide and insecticide are used, the metering mechanisms associated therewith for the dispensing of the granular product into the seed trench are relatively simple. On the other hand, mechanisms necessary to properly meter seeds at a predetermined rate and to place the seeds at predetermined relative locations and depth within the seed trench are relatively complicated.

The mechanisms associated with metering and placing of the seeds generally can be divided into a seed metering system and a seed placement system, which are in communication with each other. The seed metering system receives the seeds in a bulk manner from a seed hopper carried by the frame. Different types of seed metering systems can be used such as seed plates, finger plates and seed disks. In the case of a seed disk metering system, a seed disk is formed with a plurality of seed cells spaced about the periphery thereof. Seeds are moved into the seed cells with one or more seeds in each seed cell depending upon the size and configuration of the seed cell. A vacuum or positive pressure airflow may be used in conjunction with the seed disk to assist in movement and retention of the seeds in the seed cells. The seeds are singulated and discharged at a predetermined rate to the seed placement system.

The seed placement system may be categorized as a gravity drop system or a power drop system. In the case of a gravity drop system, a seed tube has an inlet end, which is positioned below the seed metering system. The singulated seeds from the seed metering system merely drop into the seed tube and fall by way of gravitational force from a discharge end thereof into the seed trench. The seed tube may be curved in a rearward manner to assist in directing the seed into the seed trench.

A seed placement system of the power drop variety generally can be classified as a seed conveyor belt drop, rotary valve drop, chain drop or air drop. These types of seed placement systems provide somewhat consistent placement of the seeds along a predetermined path at a desired spacing.

It is well known in the agricultural industry to use an electronic planting monitor on seeders to monitor the seed which is placed in the furrow. When first employed, monitors were used to alert the operator of a plugged row unit or a unit without any seed to avoid continued operation of the planter without actually planting seed. More recently, studies have quantified the importance of accurate seed spacing in improving crop yields. As a result, monitor technology has advanced in efforts to determine seed spacing. Current monitors determine skips and multiples of seed. These monitors also predict seed spacing in the furrow based on the timing of seed passing a sensor (such as a photo-electric eye) in a seed tube but are not capable of determining actual seed spacing.

One example of a seed spacing monitor is disclosed in U.S. Pat. No. 6,386,128 B1 (Svoboda et al.). The '128 patent senses the seed and determines a geospatial location of the seed. From this information, seed spacing can be determined. However, the sensor is described as detecting the falling seed and transmitting a corresponding signal to the computer which then records the seed drop event. In this system, since the sensor detects "falling" seed, any bounce or roll of the seed in the furrow is not accounted for in determining the seed location.

U.S. Pat. No. 7,726,251 B1 (Peterson et al.), which is assigned to the assignee of the present invention, discloses that it is possible to sense seeds directly in a seed trench. Referring to FIGS. 7 and 8, a sensor may be used to sense seeds in the seed trench, and the pulses representing each sensed seed are used to uniformly stagger seeds relative to each other in a twin row seeding application.

What is needed in the art is a way of more accurately detecting seed spacing of seeds which are placed in a furrow in the soil.

SUMMARY OF THE INVENTION

The seed spacing monitoring system of the present invention uses a sensor such as a video camera, infra-red (IR) video camera, IR scanner, IR sensor, capacitive sensor, microwave sensor, etc. to sense the seed in its final location in the seed furrow immediately before the furrow is closed, covering the seed with soil. The time between detecting adjacent seeds and the planter travel speed is used to calculate the seed spacing.

Various types of detectors may be used. When the detector is configured as an IR sensor/scanner/camera, preheating of the seed before planting may assist in distinguishing between seed and soil or rocks in the furrow. An IR sensor/scanner/camera with seed pre-heating may be needed to accurately sense seeds in a dusty environment typical of seed planting.

The invention in one form is directed to a seed spacing monitoring system for use In an agricultural seeder for planting seeds. The agricultural seeder has a furrow opener, a seed meter for metering seed to be deposited in the furrow, and a furrow closer to cover the seed in the furrow. The seed spacing monitoring system includes a detector supported to detect seeds in the furrow prior to the seeds being covered. The detector provides a plurality of seed presence signals, with each seed presence signal being indicative of a respective seed present in the furrow. A speed sensor is associated with the seeder and provides a speed signal indicating a ground speed of the seeder. An electrical processor receives the plurality of seed presence signals and the speed signal. The electrical processor determines a seed spacing, dependent upon the seed presence signals and the speed signal.

The invention in another form is directed to an agricultural seeder for planting seeds in soil. The seeder includes a row crop unit having a furrow opener for opening a furrow in the soil, a seed meter for dispensing seed into the furrow, a furrow closer to cover the seed in the furrow with soil, and a detector configured and arranged to sense seed deposited in the furrow between the furrow opener and the furrow closer.

The invention in yet another form is directed to a seed spacing detection method for detecting seed spacing of seeds placed in a furrow by a seeder. The method includes the steps of: opening a furrow in the soil; metering seed to deposit into the furrow; depositing the metered seed into the furrow; detecting a first seed in the furrow; detecting a second seed in the furrow; measuring the time between detecting the first seed and the second seed in the furrow; measuring a ground speed of the seeder; and determining a distance between the first seed and the second seed based on the time between detecting the first seed and the second seed, and the ground speed of the seeder.

DETAILED DESCRIPTION OF THE INVENTION

Figure 1:
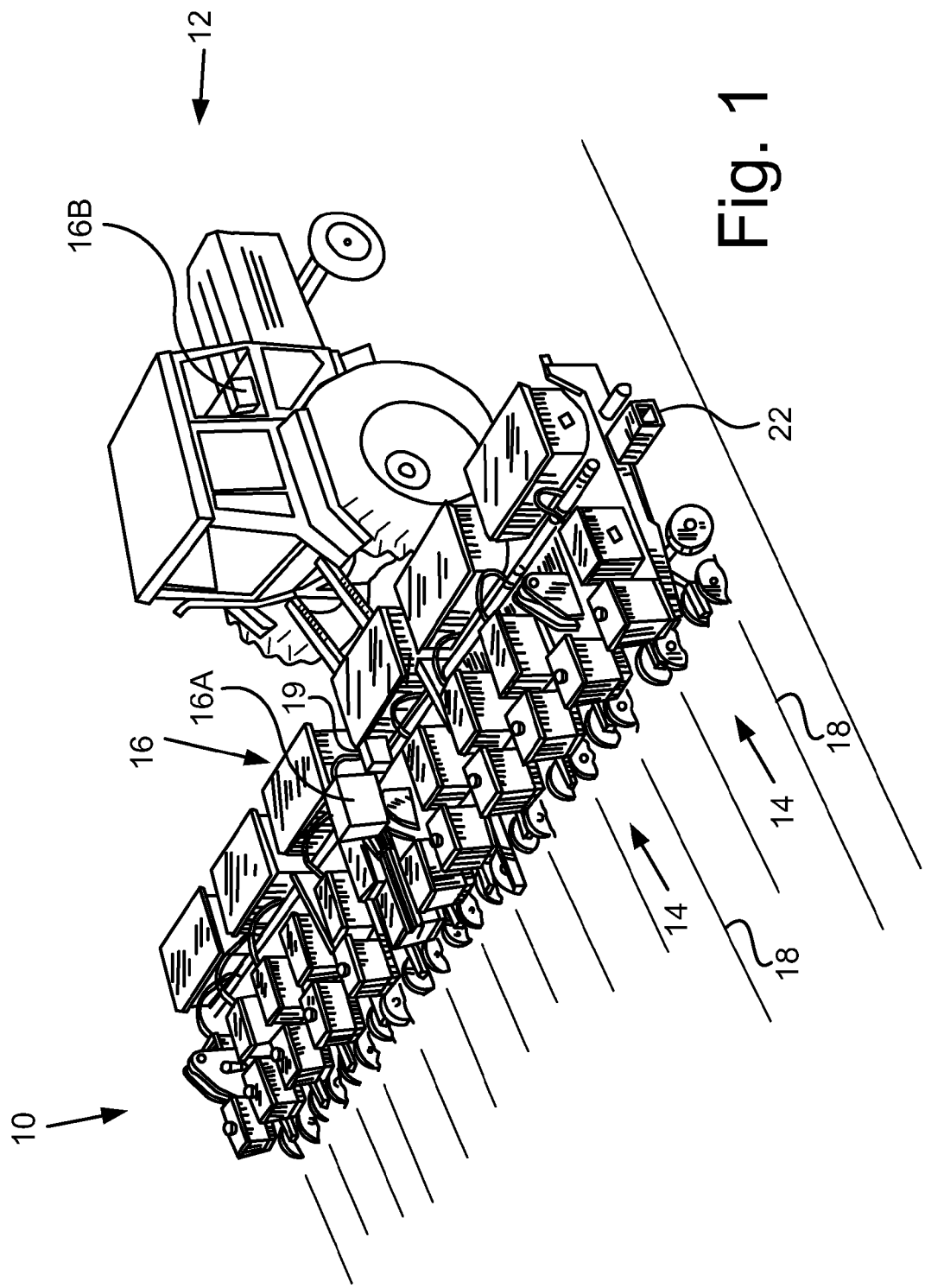
FIG. 1 is a perspective view of an agricultural seeder incorporating an embodiment of a seed spacing monitoring system of the present invention.

Referring now to the drawings, and more particularly to FIG. 1, there is shown an embodiment of an agricultural seeder 10 of the present invention. In the embodiment shown, seeder 10 is in the form of a row crop planter but may also be in the form of a grain drill, etc. A prime mover in the form of a tractor 12 is coupled with and provides motive power to seeder 10 through a suitable coupling arrangement, such as a draw bar or 3-point hitch arrangement.

Seeder 10 includes a number of row crop units 14, with each row crop unit 14 being substantially identically configured. A seed spacing monitoring system 16, which may be located onboard each of seeder 10 and tractor 12 (as shown), is used to monitor the placement of seeds within respective furrows 18 formed by each row crop unit 14. Seed spacing monitoring system 16 may include an electrical processor 16A onboard seeder 10, an electrical processor 16B onboard tractor 12, a ground speed sensor 19 and a number of detectors (not visible in FIG. 1) for detecting seeds in respective furrows 18.

Ground speed sensor 19 may be located on tractor 12 or seeder 10 and provides an output signal to electrical processor 16A and/or 16B representative of the speed of seeder 12 across the ground. For example, the ground speed signal may be determined based on the engine speed and selected gear of tractor 12, a ground speed sensor 19 on seeder 12, a ground driven speed sensor associated with a ground contacting wheel of seeder 12, a Global Positioning System (GPS), a sonar system directed at the ground, a radar system directed at the ground, etc.

Figure 2:
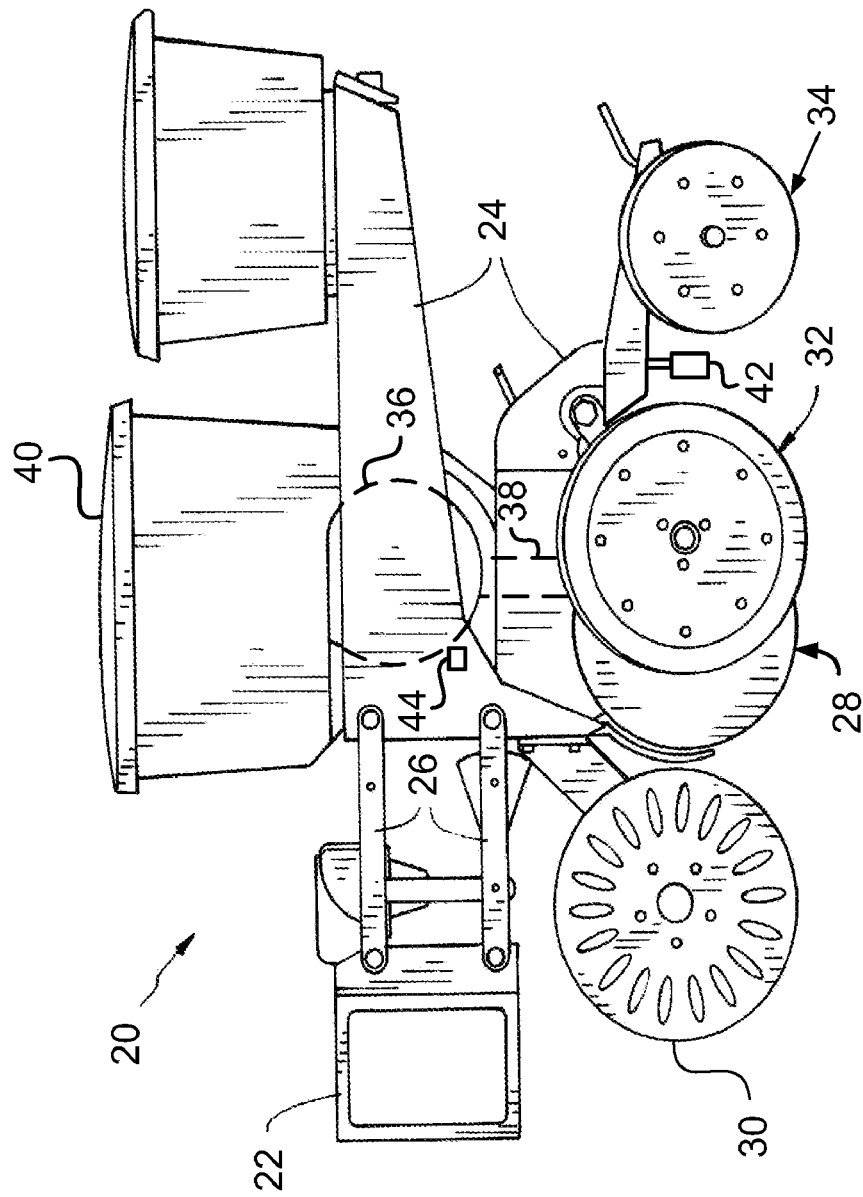
FIG. 2 is a side view of a portion of an agricultural seeder including a row crop unit with a seed spacing monitoring system of the present invention.

Referring now to FIG. 2, there is shown a single row crop unit 20 of a multi-row planter, with each row crop unit 20 being substantially identical and connected to a common tool bar 22. Only a single row crop unit 20 is shown and described below for simplicity sake.

Row crop unit 20 includes a multi-part frame 24 which is attached to tool bar 22 by parallel linkage 26. Tool bar 22 is coupled to a traction unit (not shown in FIG. 2), such as tractor 12. For example, tool bar 22 may be coupled to tractor 12 using a draw bar or 3-point hitch assembly. Tool bar 22 may be coupled with transport wheel assemblies, marker arms, etc. which may be of conventional design and not shown for simplicity sake.

Frame 24 carries a double disc furrow opener 28 for forming a seed trench in soil. An optional fluted coulter wheel 30, particularly for use in no till situations, may be placed ahead of double disc furrow opener 28. A pair of gauge wheels 32 are respectively associated with the pair of discs of double disc furrow opener 28. More particularly, each gauge wheel 32 is positioned generally in line with and immediately adjacent to the outside of each respective disc of double disc furrow opener 28. Each gauge wheel 32 may be vertically adjusted to adjust the depth of the trench which is cut into the soil using double disc furrow opener 28.

A furrow closer in the form of a pair of closing wheels 34 is also carried by frame 24. Closing wheels 34 are positioned generally in line with double disc furrow opener 28. Closing wheels 34 are preferably biased in a downward direction and have a peripheral edge with a shape which may vary, depending upon the application.

A seed metering system 36 and a seed placement system 38 are also carried by frame 24 (each shown partially in phantom lines). Seed metering system 36 receives seed from a main seed supply, such as seed from a distant main seed hopper which is supplied via air or the like, or a seed hopper 40 carried above frame 24. Seed metering system 36 singulates the seed and transfers the seed to seed placement system 38. Seed placement system 38 is in the form of a gravity drop seed tube, but could be configured differently, such as a power drop seed placement system with a powered wheel, etc.

According to an aspect of the present invention, a detector 42 forming part of the seed spacing monitoring system 16 is supported to detect seeds in the furrow prior to the seeds being covered by closing wheels 34. Detector 42 is preferably located between furrow opener 28 and closing wheels 34, and detects the presence of seeds within the furrow 18. Detector 42 provides a plurality of seed presence signals to electrical processor 16A (FIG. 1), with each seed presence signal being indicative of a respective seed present in the furrow.

In the embodiment illustrated in FIG. 2, detector 42 is configured as an IR sensor which detects the presence of individual seeds in the furrow by sensing a temperature difference between the individual seeds and the surrounding ground. This may be accomplished by using a seed temperature conditioner to either heat or cool the seeds prior to placement within the furrow. For example, a seed temperature conditioner in the form of a heater 44 can be used to blow hot air across the seeds at a suitable location within seed metering system 36. Heating of the seed between 1 to 5° F., and even as little as 1.8° F., more than the ground temperature will enable IR sensing. Also, cooling by that difference will enable IR sensing. With such an IR sensor, a narrow sensing window can be used to sense when a seed passes the sensor within the furrow, and the sensing event can be time stamped or geo-referenced.

Other types of heaters may also be used. For example, it is possible to heat the air used to move the seed from central tanks to the mini-hoppers on the row unit. Heaters which are powered by electric, gas or diesel, etc. can be used to heat the air surrounding the seed. It may also be possible to heat seeds with the exhaust air from the vacuum fan. Heated air can also be used through a nozzle to agitate the seeds in the mini-hopper and also heat the seeds. It may also be possible to divert some of the engine exhaust to heat the seeds directly or use an air-to-air heat exchanger.

In another embodiment of the invention, detector 42 can be configured as a video camera which is mounted to the row crop unit and arranged to view the furrow between furrow opener 28 and closing wheels 34. There, the video camera can see seeds passing beneath the camera after being placed in the furrow and coming to rest at the bottom of the furrow. This results in the sensing of an actual location of the seed in the furrow. The image viewed by the camera is transmitted to processor 16A which determines when a seed comes into view. Processor 16A then measures the time until the next seed is detected. With planter speed information, the distance between seeds is determined.

If detector 42 is configured as a video camera, it is necessary to analyze the video frames to detect when a seed passes a predetermined point on the image, such as a transverse center line. If planting at 9 mph (target goal), it may be necessary to have as many as four frames showing a given seed to determine when the seed crosses a mid-line. If the seed spacing is 6 inches, this requires a high speed video of 120-200 frames per second.

Other types of detectors for detecting individual seeds within the furrow are also possible. For example, detector 42 can be configured as a magnetic sensor, a microwave sensor, or other suitable sensor. If detector 42 is configured as a magnetic sensor, the seeds are coated with a magnetic coating which can be sensed by the magnetic sensor prior to placement within the furrow. If detector 42 is configured as a microwave sensor, the difference in the dielectric constant of the seed and soil is utilized. With a microwave sensor, it is likely necessary to adjust for changing soil moisture throughout the day or moisture differences in the field.

Figure 3:
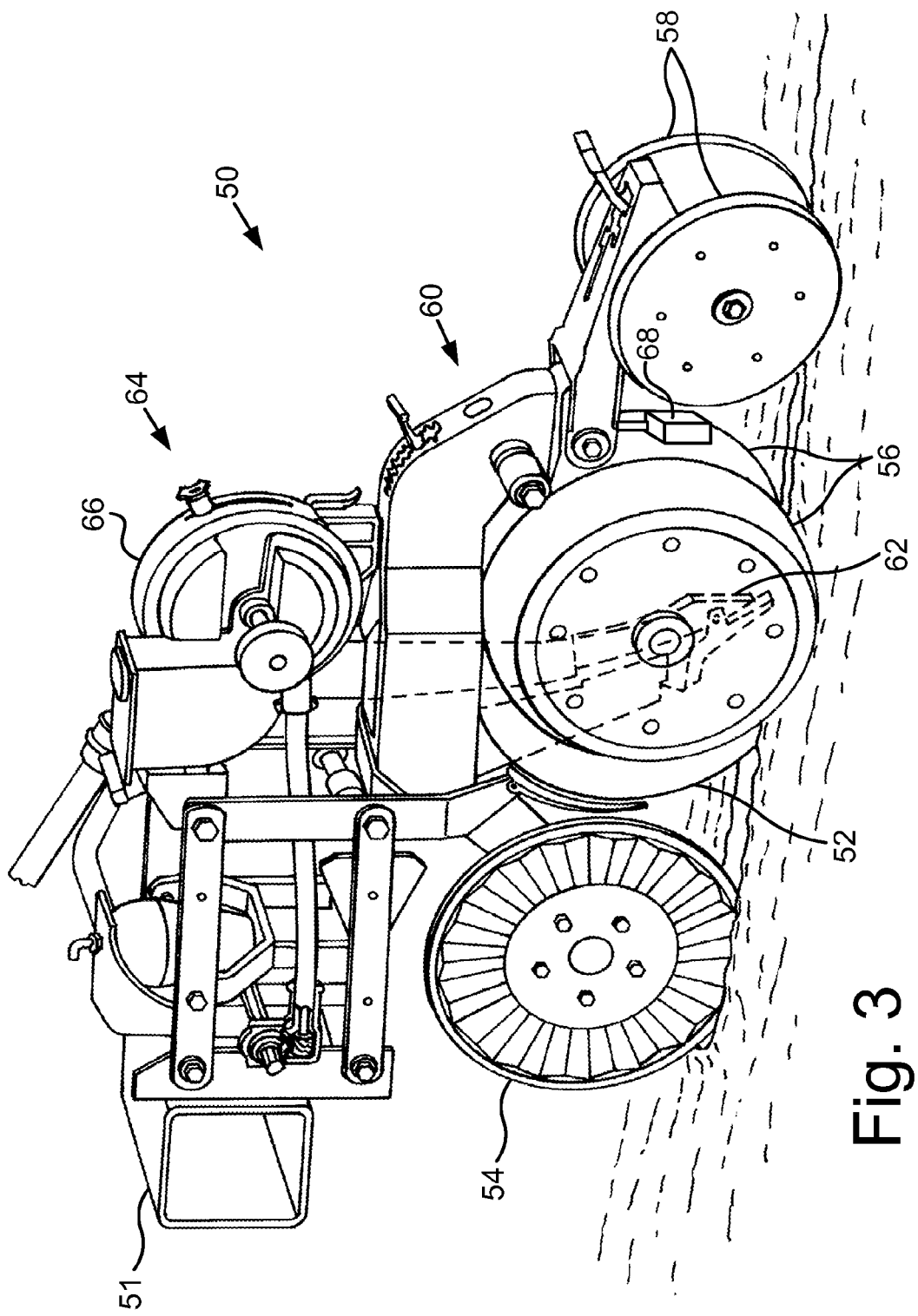
FIG. 3 is a perspective view of a portion of another agricultural seeder including a row crop unit with a seed spacing monitoring system of the present invention.

Referring now to FIG. 3, there is shown another embodiment of a single row crop unit 50 of a multi-row planter, with each row crop unit 50 being substantially identical and connected to a common tool bar 51. Only a single row crop unit 50 is shown and described below for simplicity sake.

Row crop unit 50 carries a double disc furrow opener 52 for forming a seed trench in the soil. An optional coulter wheel 54, particularly for use in no-till situations, may be placed ahead of double disc furrow opener 52. A pair of gauge wheels 56 are respectively associated with the pair of discs of double disc furrow opener 52. More particularly, each gauge wheel 56 is positioned generally in line with and immediately adjacent to the outside of each respective disc of double disc furrow opener 52. Each gauge wheel 56 may be vertically adjusted to adjust the depth of the trench which is cut into the soil using double disc furrow opener 52. A furrow closer in the form of a pair of closing wheels 58 are positioned generally in line with double disc furrow opener 52. Closing wheels 58 are preferably biased in a downward direction and have a peripheral edge with a shape which may vary, depending upon the application.

A seed placement system 60 is shown in the form of a gravity drop seed tube 62, but could be configured differently, such as a power drop seed placement system with a powered wheel, etc.

A seed metering system 64 receives seed from a main seed supply, such as seed from a distant main seed hopper which is supplied via air or the like, or a seed hopper carried by tool bar 51. Within a housing 66 of seed metering system 64 there is a seed pool area. A seed disk within housing 66 (not visible) has a plurality of holes with seed cells on the seed side of the disk intermittently spaced about the periphery thereof. The vacuum airflow promotes entry of the seeds into the seed cells and maintains the seeds in place within the seed cells. Seeds are transported from the seed cells to seed tube 62. Of course, seed metering system 64 may be configured with a positive pressure to assist in seed movement rather than a vacuum pressure.

Similar to row crop unit 20 described above, row crop unit 50 has a detector 68 which is located in an area between furrow opener 52 and closing wheels 58. Detector 68 may be configured as described above with reference to detector 42, such as an IR sensor, video camera, magnetic sensor or microwave sensor. Detector 68 is coupled with electrical processor 16A, either wired or wirelessly, and provides a plurality of seed presence signals to electrical processor 16A. Electrical processor 16A receives the plurality of seed presence signals from detector 68 and a speed signal from speed sensor 19, and determines a seed spacing which is dependent upon each of the seed presence signals and speed signal.

Figure 4:
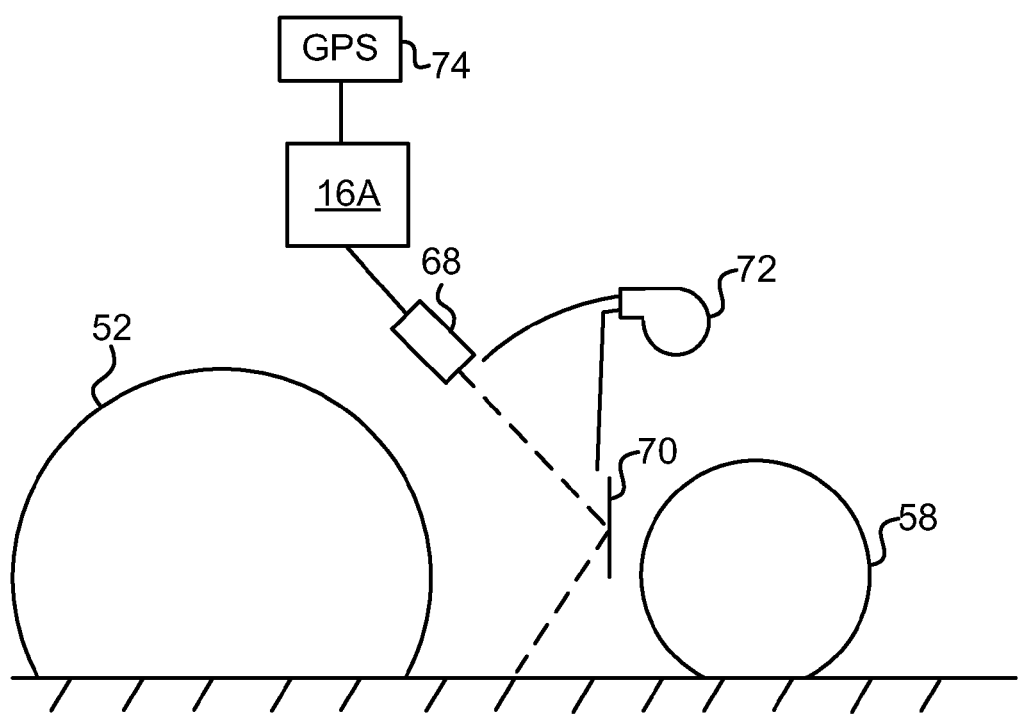
FIG. 4 is a schematic side view of yet another embodiment of a seed spacing monitoring system of the present invention.

With each of the detectors 42 and 68 shown in FIGS. 2 and 3, the detector 42, 68 is positioned such that the sensor directly detects the seed within the furrow. However, it is also possible, depending upon the application and configuration of a particular row crop unit, to position an intervening mirror 70, optical lens or the like (FIG. 4) between the detector and the furrow, while still allowing accurate sensing of the seed within the furrow. Moreover, it may be desirable to utilize a fan 72, which may be connected by appropriate tubing, etc, to blow air across detector 68 and/or mirror 70 to inhibit the accumulation of dust or other matter which could interfere with proper sensing of seed within the furrow.

In the embodiments of the seed spacing monitoring systems described above, temperature sensitive sensors 42 and 68 provide seed presence signals to electrical processors 16A and/or 16B, which in turn time stamp the seed presence signals and determine a seed spacing based on the time relationship between seeds. However, it may be desirable to geo-reference the seed presence signals using a geo-referencing system. One type of geo-referencing system is a GPS 74 which may be used to geo-reference the location of each sensed seed within the furrow. More specifically, the assignee of the present invention markets a GPS known as a "Green-Star" GPS which is typically mounted on top of the cab of tractor 12 (not shown), and could be used with the present invention for geo-referencing of the seed presence signals. As another option, a stand-alone GPS could be mounted to seeder 10 for geo-referencing the seed presence signals. As yet another option, a geo-referencing system configured as a localized sensor system could be used to geo-reference the seed presence signals. For example, sensors could be positioned at predefined locations around the perimeter of a field which interact with a transceiver mounted on seeder 10 for geo-referencing the seed presence signals.

Figure 5:
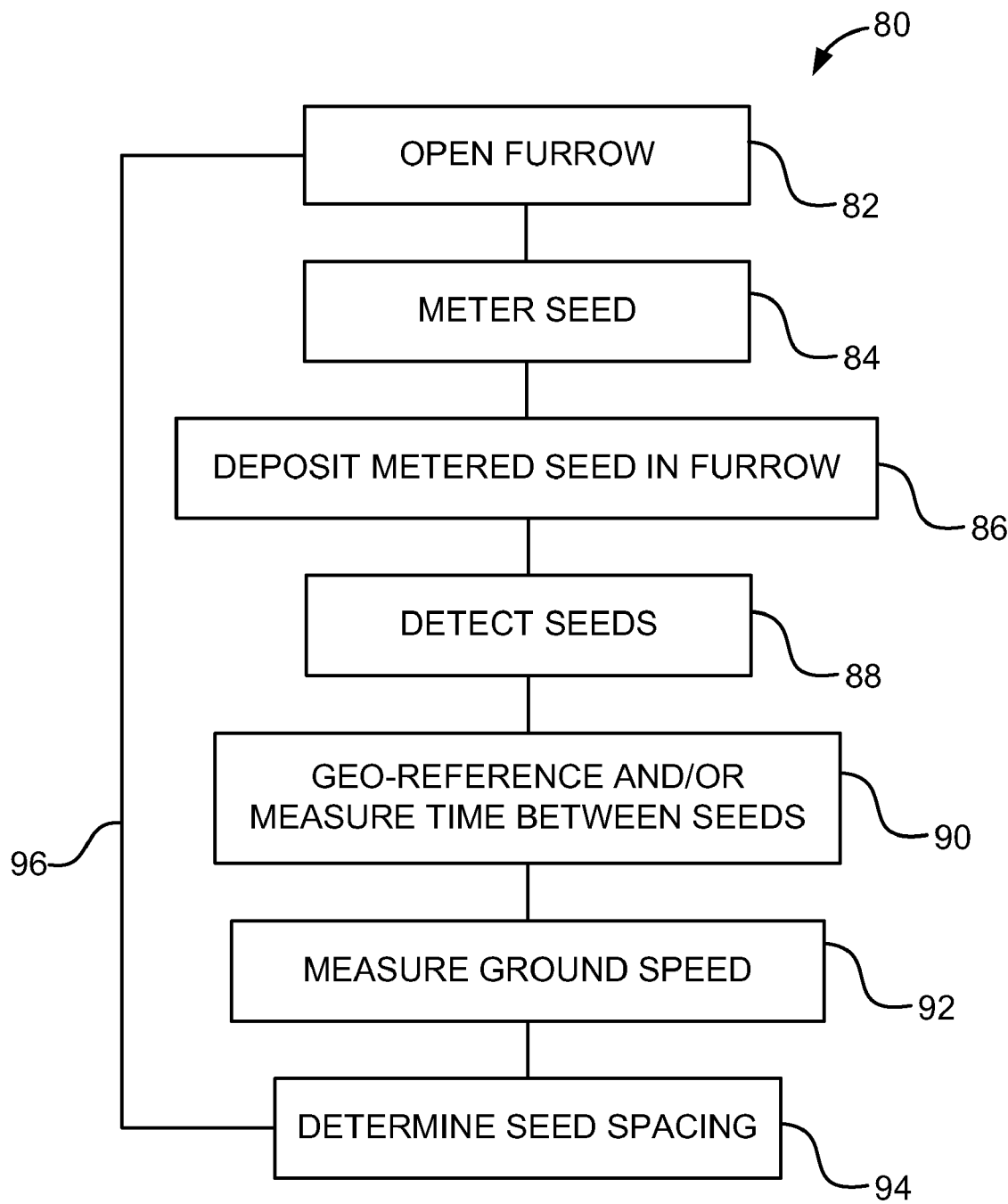
FIG. 5 is a flowchart of a method of operating a seeder using a seed spacing monitoring system of the present invention.

Referring now to FIG. 5, a method of operation 80 of the seed spacing monitoring system 16 will be described in greater detail. As described above, a furrow opener 28, 52 is used to open a furrow in the soil (block 82). A seed metering system 36, 64 receives seed from a seed source, singulates the seed, and passes the singulated seed to a seed placement system (block 84). The singulated seed is deposited in the furrow by seed placement system 38, 60 at a predetermined seeding population (block 86). A detector 42, 68 detects a series of seeds and transmits seed presence signals corresponding to each sensed seed to electrical processor 16A (block 88). Electrical processor 16A measures the time between the seeds (block 90) and/or alternatively geo-references the seeds using a GPS 74. The time between seeds is combined with a ground speed and used to determine a spatial attribute in the form of a seed spacing between seeds (blocks 92 and 94). The monitoring method continues while the seeding operation is in effect (line 96).

More particularly, the ground speed is typically measured in units of miles per hour (miles/hour) and the time between seeds is measured in units of seconds/seed. Using appropriate conversion factors, the seed spacing (inches per seed) can be converted in one embodiment as follows:

$$\frac{miles}{hour} \times \frac{hour}{second} \times \frac{inches}{mile} \times \frac{second}{seed} = \frac{inches}{seed}$$

The ground speed and detector output signal can thus be combined in an appropriate manner to yield a measurement of seed spacing between seeds. The electrical processor 16B onboard tractor 12 may include a visual display which provides information to the operator in the form of the percentage of skips, the percentage of double seeding, the actual or average spacing of the seed, etc.

Memory within electrical processor 16A and/or 16B can store the seed spacing information for a predetermined number of seeds and calculate an average seed spacing together with a statistical measure of variability, such as the standard deviation in the seed spacing, and display that information to the operator, such as at a display of electrical processor 16B. The operator can determine if the seed spacing is within the desired limits and also if the variability in seed spacing is within desired limits. If the average seed spacing and/or the variability are outside the desired limits, the operator can take corrective action.

Having described the preferred embodiment, it will become apparent that various modifications can be made without departing from the scope of the invention as defined in the accompanying claims.

The invention claimed is:

1. A seed spacing monitoring system for use in an agricultural seeder for planting seeds, the agricultural seeder having a furrow opener, a seed meter for metering seeds to be dispensed in the furrow, and a furrow closer to cover the seeds in the furrow, said seed spacing monitoring system comprising:
    a detector supported to detect seeds in the furrow prior to the seeds being covered, said detector providing a plurality of seed presence signals, each said seed presence signal being indicative of a respective seed present in the furrow, wherein said detector comprises one of an infrared (IR) sensor, an IR camera and an IR scanner;
    a speed sensor associated with said seeder and providing a speed signal indicating a ground speed of the seeder;
    an electrical processor receiving said plurality of seed presence signals and said speed signal, said electrical processor determining a seed spacing dependent upon said seed presence signals and said speed signal; and
    a seed temperature conditioner for varying a temperature of the seeds prior to being deposited in the furrow, wherein said seed temperature conditioner is a heater which elevates the temperature of the seeds above surrounding ground temperature and wherein the one of the IR sensor, the IR camera and the IR scanner detects the presence of the seeds in the furrow by sensing a temperature difference between the seeds and the surrounding ground.

2. The seed spacing monitoring system of claim 1, wherein said electrical processor receives said plurality of seed presence signals and establishes a plurality of times, each said time representing a time between detections of adjacent seeds in the furrow.

3. The seed spacing monitoring system of claim 2, wherein said electrical processor determines said seed spacing based upon said plurality of times.

4. The seed spacing monitoring system of claim 2, wherein said electrical processor determines a statistical measure of variability of said seed spacing, based upon distances between the seeds.

5. The seed spacing monitoring system of claim 4, wherein said statistical measure of variability is a standard deviation.

6. The seed spacing monitoring system of claim 1, further including a geo-referencing system, and wherein said electrical processor geo-references each said seed presence signal using said geo-reference system.

7. The seed spacing monitoring system of claim 6, wherein said electrical processor determines said seed spacing based upon said geo-referenced seed presence signals.

8. The seed spacing monitoring system of claim 6, wherein said geo-referencing system is a global positioning system.

9. The seed spacing monitoring system of claim 1, further including a minor interposed between said detector and the furrow.

10. The seed spacing monitoring system of claim 1, further including a fan positioned and configured for blowing air to inhibit dust from interfering with operation of said detector.

* * * * *